US012639187B2

(12) United States Patent
　　Chen

(10) Patent No.:　　US 12,639,187 B2
(45) Date of Patent:　　May 26, 2026

(54) MEMORY SYSTEMS, HEAT DISSIPATION DEVICES, AND CONTROL METHODS

(71) Applicant: Yangtze Memory Technologies Co., Ltd., Wuhan (CN)

(72) Inventor: Zhongxiang Chen, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/807,296

(22) Filed: Aug. 16, 2024

(65) Prior Publication Data

US 2025/0328444 A1　　Oct. 23, 2025

(30) Foreign Application Priority Data

Apr. 19, 2024　(CN) .......................... 202410480038.7

(51) Int. Cl.
*G06F 11/32*　　　(2006.01)
*G06F 1/20*　　　(2006.01)

(52) U.S. Cl.
CPC ............ *G06F 11/325* (2013.01); *G06F 1/206* (2013.01)

(58) Field of Classification Search
CPC ................................ G06F 11/325; G06F 1/206
See application file for complete search history.

(56) References Cited

U.S. PATENT DOCUMENTS

| | | | | |
|---|---|---|---|---|
| 6,993,690 | B1 * | 1/2006 | Okamoto | G11C 16/3418 365/185.33 |
| 7,277,011 | B2 * | 10/2007 | Estakhri | G11C 16/349 365/228 |
| 7,683,801 | B2 * | 3/2010 | Winarski | G08B 5/36 340/815.45 |
| 9,116,619 | B2 * | 8/2015 | Thiesfeld | G11C 16/20 |
| 10,458,421 | B2 * | 10/2019 | Richter | F04D 27/004 |
| 2003/0161199 | A1 * | 8/2003 | Estakhri | G11C 29/44 365/200 |
| 2005/0040964 | A1 * | 2/2005 | Thomas | G06F 11/325 340/815.45 |
| 2008/0231439 | A1 * | 9/2008 | Wu | G06F 11/325 340/540 |
| 2009/0228823 | A1 * | 9/2009 | Edwards | G06F 3/0605 715/765 |
| 2022/0026064 | A1 * | 1/2022 | Beghi | F23N 1/002 |

* cited by examiner

*Primary Examiner* — Ashish Thomas
*Assistant Examiner* — Catherine Marie Nguyen
(74) *Attorney, Agent, or Firm* — Hanley, Flight & Zimmerman, LLC

(57)　　　　ABSTRACT

The present disclosure provides memory systems, heat dissipation devices, and control methods. An example memory system includes a circuit board, wherein the circuit board is provided with a memory device and a first interface coupling structure. The memory device is coupled with the first interface coupling structure. The memory device is configured to: send a state indication signal to a heat dissipation device through the first interface coupling structure, wherein the state indication signal is configured to indicate working state information of the memory system.

20 Claims, 12 Drawing Sheets

10000

2000

100

110

111

Host

Memory controller

106

104

Memory

200

Heat dissipation device

MEMORY SYSTEMS, HEAT DISSIPATION DEVICES, AND CONTROL METHODS

CROSS-REFERENCE TO RELATED APPLICATION

This application claims priority to and the benefit of Chinese Patent Application 202410480038.7, filed on Apr. 19, 2024, which is hereby incorporated by reference in its entirety.

TECHNICAL FIELD

The present disclosure relates the technical field of data storage, relating to but not limited to memory systems, heat dissipation devices, and control methods.

BACKGROUND

The memory system such as a solid state drive (SSD) shows a current read/write state by providing a display structure on a body.

BRIEF DESCRIPTION OF THE DRAWINGS

In order to illustrate the technical solutions in the present disclosure more clearly, the drawings to be used in some examples of the present disclosure will be briefly introduced below. Apparently, the drawings in the following description are only drawings of some examples of the present disclosure. Those of ordinary skills in the art may also obtain other drawings according to these drawings. In addition, the drawings in the following description may be regarded as schematic diagrams, instead of limitations to an actual size of a product, an actual flow of a method, an actual timing of a signal, etc. involved in the examples of the present disclosure.

FIG. 7 is a schematic module diagram of an electronic apparatus according to some examples.

DETAILED DESCRIPTION

Figure 1:
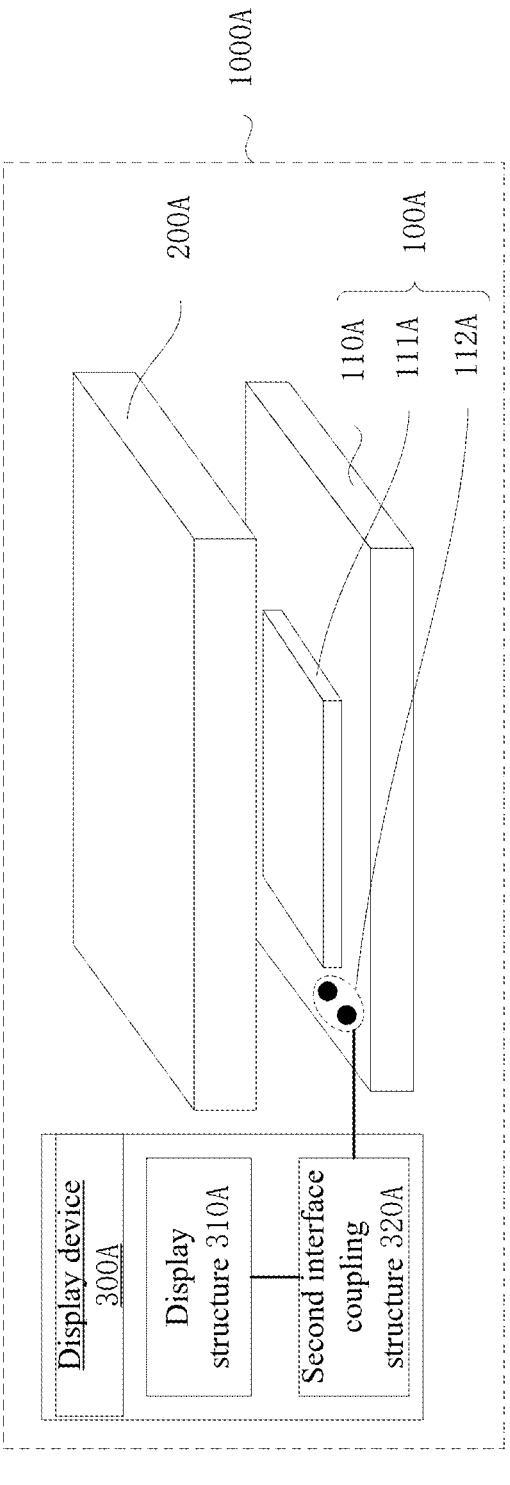
FIG. 1 is a schematic module diagram I of a memory apparatus according to some examples.

The technical solutions in some examples of the present disclosure will be described below clearly and completely in conjunction with the drawings. Apparently, the examples described are only part of, but not all of, the examples of the present disclosure. All other examples obtained by those of ordinary skills in the art based on the examples provided by the present disclosure shall fall within the scope of protection of the present disclosure.

Unless otherwise specified in the context, throughout the specification and the claims, the term "comprise" or "include" is interpreted as an open and inclusive meaning, i.e., "including, but not limited to". In the description of the specification, the terms "one example", "some examples", "an example", or "in an example", etc. are intended to indicate that particular features, structures, materials, or characteristics related to the example are included in at least one example of the present disclosure. The schematic representation of the above terms may not necessarily refer to the same example. Furthermore, these particular features, structures, materials, or characteristics may be included in one or more examples in any suitable manner.

In the following, the terms "first" and "second" are only for the purpose of description, and cannot be construed as indicating or implying relative importance or implicitly indicating the number of indicated technical features. Thus, features defined by "first" and "second" may explicitly or implicitly include one or more of such features. In the description of the examples of the present disclosure, "a plurality of" means two or more, unless otherwise stated.

In describing some examples, the expressions "coupled", "couple", and "connected" and derivatives thereof may be used. For example, the term "connected" may be used in the description of some examples to indicate that two or more components have a direct physical contact or an electrical contact with each other. For another example, the term "couple" may be used in the description of some examples to indicate that two or more components have a direct physical or electrical contact. However, the term "couple" may also mean that two or more components are not in direct contact with each other, but they still cooperate or interact with each other. The examples disclosed herein are not necessarily limited to the content herein.

"At least one of A, B and C" and "at least one of A, B or C" have the same meaning, both including the following combinations of A, B and C: A alone, B alone, C alone, a combination of A and B, a combination of A and C, a combination of B and C, and a combination of A, B and C.

"A and/or B" includes the following three combinations: A alone, B alone, and a combination of A and B.

The use of "suitable for" or "configured to" herein means open and inclusive language, and does not exclude an apparatus suitable for performing or configured to perform additional tasks or operations.

In addition, the use of "based on" means openness and inclusiveness, as processes, operations, calculations, or other actions "based on" one or more conditions or values may be based on an additional condition or exceeded value in practice.

Some basic concepts involved in examples of the present application are first explained and described.

A memory system such as a solid state drive is a hard disk that is manufactured by employing a solid state electronic memory chip array, and uses a semiconductor flash as a medium. An entire memory system should comprise two portions, which are hardware compositions and software control. From the perspective of the hardware compositions, the memory system mainly consists of a control cell, a memory cell, and a printed circuit board (PCB), wherein the control cell mainly comprises a controller, a memory (e.g., a NAND flash memory), and a cache chip (Dynamic Random Access Memory (DRAM)). From the perspective of the software, a main body controlled by entire software is firmware of the memory system, and the firmware is stored in the master controller of the memory system. A main task of the firmware is to realize a read/write operation of data from an interface of the memory system to a storage medium thereon, and to control the memory system internally. The entire memory system performs various operations comprising read and write by means of the combination of hardware and software. The memory system is connected with a host through respective physical interfaces, and performs data interaction based on corresponding communication protocols.

The life span of the memory system is generally affected by limitations on program/erase counts of the memory cells. Each memory cell has a limited program/erase count, i.e., the number of times that the memory cell may be programmed (write data) and erased (clear data). Each time new data is written to the memory cell, old data generally needs to be erased first. Therefore, each complete write operation comprises one erase operation and one program operation. The number of these erase operations is recorded through erase counts. The Erase Count is an important index, and is configured to measure the number of times that the memory cell in the memory system is erased. Since the memory cell has the physically limited erase count, the Erase Count is directly related to the life span and performance of the memory system. By acquiring the Erase Count, a health state of the memory system may be evaluated, and appropriate measures are taken to ensure the integrity and reliability of data. When the Erase Count approaches or reaches a program/erase limit of the memory cell, the performance of the memory system may degrade, and there may even be a risk of data loss. Therefore, the firmware or management software of the memory system detects the Erase Count, and takes measures when necessary, for example, entering a Read Only mode to prevent data corruption. The memory system generally shows a current working state, a health state, and the like by providing a display structure on a body.

The memory system performs data storage through a semiconductor technology, and internally comprises many electronic elements, such as flash memory dies and a control chip, etc. These electronic elements generate heat during working, and if the heat accumulates to a certain extent, first, a storage medium of the memory system may be affected, resulting in data loss or corruption. Second, a thermal drift phenomenon occurs in the electronic elements of the memory system, which changes the electrical characteristics of the electronic elements, thus affecting the read/write speed and stability of data. Furthermore, a high temperature also accelerates an aging process of the electronic element, and shortens the life span of the memory system.

In order to ensure the working stability and life span of the memory system, heat dissipation processing needs to be performed on the memory system. Generally, an active heat dissipation device (such as a fan) or a passive heat dissipation device (such as a heat sink) to perform heat dissipation on the memory system. The heat dissipation device may effectively dissipate heat generated by the memory system, so as to avoid heat accumulation. Meanwhile, the heat dissipation device may also reduce a temperature of a surrounding environment, thereby providing a desirable working environment for the memory system.

However, while the heat dissipation devices (e.g., the heat sinks) are used to perform heat dissipation on the memory system, these heat dissipation devices cover a display structure (e.g., an indicator lamp, for example, in some scenarios in which cases of desktop computers are visible internally) of an original memory system, causing inconvenience for users to observe a working state of an SSD.

For ease of observation of a working state of the memory system by the users, a solution of the present application provides a memory apparatus. As shown in FIG. 1, the memory apparatus 1000A comprises a memory system 100A, a heat dissipation device 200A, and a display device 300A. The heat dissipation device 200A is attached to a heat dissipation side of the memory system 100A, and is configured to perform heat dissipation on the memory system 100A. The display device 300A and the heat dissipation device 200A are arranged in a discrete manner. The memory system 100A comprises a circuit board 110A, and the circuit board 110A is provided thereon with a memory device 111A and a first interface coupling structure 112A. The display device 300A comprises a display structure 310A and a second interface coupling structure 320A. The first interface coupling structure 112A of the memory system 100A is connected with the second interface coupling structure 320A of the display device 300A through external routing (e.g., a metal wire). The display device 300A receives working state information from the memory system 100A through the second interface coupling structure 320A, and adjusts display content of the display structure 310A according to the working state information. In this example, a user is facilitated to observe a working state of the memory system 100A by adding the external display device 300A to show the working state information of the memory system 100A. However, by extra adding the external display device 300A and connecting the memory system 100A and the display device 300A through external routing, on the one hand, the complexity and inconvenience of routing are increased, affecting the appearance aesthetics and neatness of the memory apparatus 1000A. On the other hand, the risk of failure of the memory apparatus 1000A may be increased.

Figure 2:
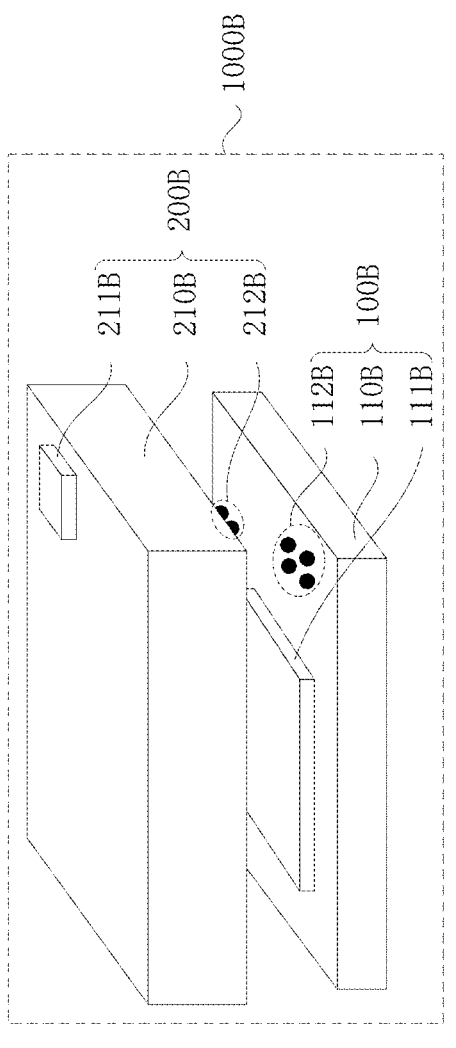
FIG. 2 is a schematic module diagram II of a memory apparatus according to some examples.

For ease of observation of the working state of the memory apparatus 1000A by the user to avoid the complexity and inconvenience of routing caused by the addition of external routing, so as to improve the appearance aesthetics and neatness of the memory apparatus 1000A and improve the reliability and stability of the working performance of the memory apparatus 1000A, a solution of the present application provides a memory apparatus. As shown in FIG. 2, the memory apparatus 1000B comprises a memory system 100B and a heat dissipation device 200B. The memory system 100B comprises a circuit board 110B, and the circuit board 110B is provided thereon with a memory device 111B and a first interface coupling structure 112B, wherein the first interface coupling structure 112B may comprise one or more metal contacts. The memory device 111B is coupled with the first interface coupling structure 112B through an internal circuit on the circuit board 110B. The heat dissipation device 200B comprises a heat spreader 210B; and a first side of the heat spreader 210B is provided with a display structure 211B, and a second side of the heat spreader 210B is provided with a second interface coupling structure 212B, wherein the second interface coupling structure 212B may comprise one or more elastic metal reeds. The display structure 211B is coupled with the second interface coupling structure 212B through internal simple routing of the heat dissipation device 200B. The memory system 100B is coupled with the elastic metal reed of the second interface coupling structure 212B through the metal contact of the first interface coupling structure 112B (when the heat dissipation device 200B is mounted to the memory system 100B, the elastic metal reed is naturally in contact with the metal contact, so as to turn on a circuit), so as to transmit an indication signal sent by the memory device 111B in the memory system 100B. In this example, the user is facilitated to observe the working state of the memory apparatus 1000B by disposing the display structure 211B on the heat spreader 210B. The memory system 100B is coupled with the elastic metal reed of the second interface coupling structure 212B through the metal contact of the first interface coupling structure 112B without extra routing added, which on the one hand facilities the disassembly of the heat dissipation device 200B, avoiding complexity and inconvenience of routing caused by the addition of external routing, thereby improving the appearance aesthetics and neatness of the memory apparatus 1000B. On the other hand, a contact type circuit structure of the metal contact and the elastic metal reed avoids the risk of poor contact due to wear and tear of a plug-in coupling structure caused by repeated plugging and unplugging. Meanwhile, there is no movable wiring, facilitating the usage of the user. Compared with a complex connection circuit, the risk of failure of the memory apparatus 1000B that may be caused by external routing fault is avoided, thereby improving the reliability and stability of the working performance of the memory apparatus 1000B.

In some possible implementations, the memory device 111B sends a state indication signal to the heat dissipation device 200B through the first interface coupling structure 112B; and the state indication signal is configured to indicate working state information of the memory system 100B. The working state information may include, but is not limited to, erase count state information, read/write state information, abnormal state information, and error state information; and the specific working state information may be updated and upgraded with firmware, so as to conveniently expand functions of the memory system 100B.

Figure 3:
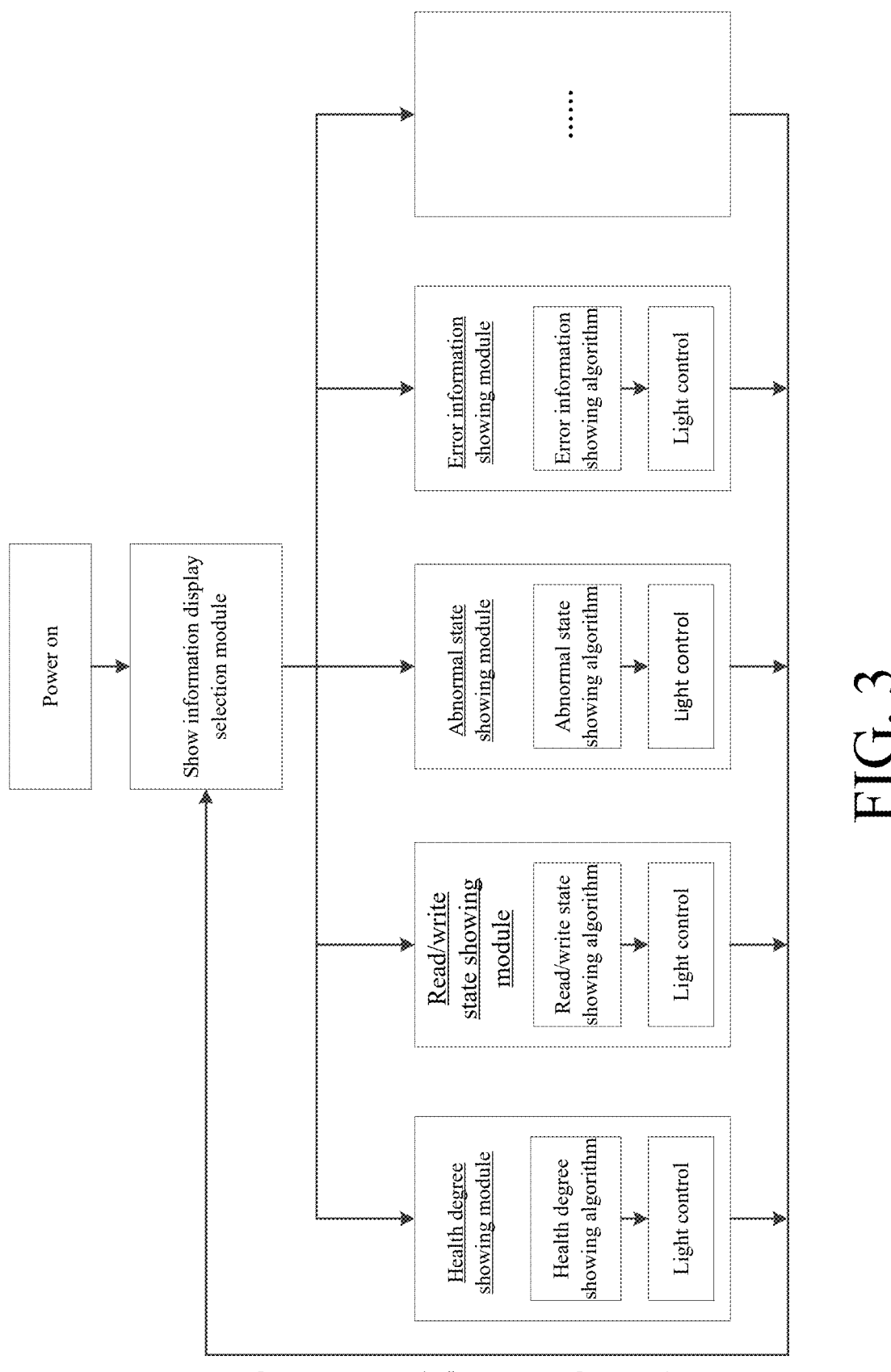
FIG. 3 is a flow diagram I of a control method according to some examples.

In some examples, the memory device 111B stores a firmware program, and the firmware program controls the display structure 211B to display different identifiers such as colors, numbers, symbols, etc. through a set of internal state related algorithms, so as to externally indicate working state information of the current memory device 111B. As shown in FIG. 3, a health degree showing module performs display control (e.g., light control) on the erase count state information of the memory system 100B through a health degree showing algorithm. A read/write state showing module performs display control (e.g., light control) on the read/write state information of the memory system 100B through a read/write state showing algorithm. An abnormal state showing module performs display control (e.g., light control) on the abnormal state information of the memory system 100B through an abnormal state showing algorithm. An error information showing module performs display control (e.g., light control) on the error state information of the memory system 100B through an error information showing algorithm. This example provides an explanation, the specific working state information may be updated and upgraded with the firmware, and the firmware is provided with various algorithm modules showing internal working state information, such that a set of algorithms may be randomly selected to externally output a display control signal, so as to expand the functions of the memory system 100B.

In some examples, the display structure 211B may be provided on any side of the heat dissipation device 200B that is not in contact with the memory system 100B, and is controlled by the memory device 111B of the memory system 100B through the second interface coupling structure 212B of the heat dissipation device 200B and the first interface coupling structure 112B of the memory system 100B. The display structure 211B receives the state indication signal from the memory system 100B through the second interface coupling structure, and adjusts a display state of the display structure 211B according to the working state information; and the display state of the display structure 211B is configured to indicate the working state information of the memory system 100B. The display structure 211B may comprise at least one indicator lamp or at least one display screen.

In an example, when the display structure 211B comprises at least one indicator lamp, the display structure 211B changes a state of the at least one indicator lamp according to the state indication signal, and the state of the indicator lamp comprises at least one of a color or a flicker frequency. The state of the at least one indicator lamp is configured to indicate different working state information of the memory system 100B. The working state information may include, but is not limited to, the erase count state information, the read/write state information, the abnormal state information, and the error state information.

In an example, for example, the indicator lamp in the display structure 211B is configured to show the erase count state information of the memory system 100B. Since a health index of the memory system 100B is closely related to an Erase Count, the Erase Count may be showed through the indicator lamp (which may be referring to as an Erase Count light control method), so as to visualize an erase count state (or a health state) of the memory system 100B. The Erase Count light control method maps a value of the Erase Count onto at least one of the color or the flicker frequency of the indicator lamp by acquiring the Erase Count, and controls the at least one of the color or the flicker frequency of the indicator lamp to transmit the erase count state of the memory system 100B to the user or a system administrator. In an example, as the Erase Count increases, the color of the indicator lamp changes according to a preset rule, or the flicker frequency of the indicator lamp increases accordingly. In this way, by observing the at least one of the color or the flicker frequency of the indicator lamp, the user or the system administrator may roughly understand the erase count state (or the health state) of the memory system 100B.

Further, the Erase Count light control method comprises the following operations when being implemented:

First, threshold setting: different Erase Count thresholds are set according to specifications and performance requirements of the memory system 100B. When the Erase Count reaches a threshold, the at least one of the color or the flicker frequency of the indicator lamp changes to remind the user or the system administrator to pay attention to the erase count state of the memory system 100B.

Next, flicker mode design: different flicker modes are designed to distinguish different Erase Count ranges. For example, different flicker frequencies, colors, or combinations thereof may be used to indicate different erase count states.

Finally, software integration: the Erase Count light control method is integrated into the firmware or management software of the memory system 100B to realize automatic control and detection. In this way, even in the absence of user intervention, the indicator lamp can also automatically adjust the flicker mode according to a state of the Erase Count.

Through the Erase Count light control method, the user or the system administrator may understand the erase count state of the memory system 100B more visually, so as to timely take necessary measures to protect data and prolong the life span of the memory system 100B. Meanwhile, an effective means is provided for manufacturers of the memory system 100B to transmit an erase count state of a product to the user, thereby improving user experience and trust.

Further, the display structure 211B may display different colors and/or flicker frequencies through one indicator lamp, or may also be provided with the plurality of indicator lamps, and each indicator lamp displays a preset color and/or flicker frequency. In this example, for example, the display structure 211B comprises a green (G) indicator lamp, a yellow (Y) indicator lamp, and a red (R) indicator lamp (for example, Controller pin signals corresponding to contacts of the first interface coupling structure 112B are configured to a power supply (VCC), ground (GND), G, Y, and R), and the erase count state (or the health state) of the memory system 100B is indicated by the color of the indicator lamp. A life cycle of the memory system 100B may be divided into three modes of Beginning Of Life (BOL), End Of Life (EOL), and Read Only according to the Erase Count. The division of the life cycle of the memory system 100B is not limited here, and a specific division method may be modified in a targeted manner according to an actual memory system 100B. Herein, the BOL mode indicates that an erase count of the memory system 100B is in a first erase count interval, and in an initial state of the life cycle of the memory system 100B, or in an initial life stage. In this stage, the performance of the memory system 100B is in a good state. In the Erase Count light control method, the BOL mode may correspond to the green indicator lamp. The EOL mode indicates that the erase count of the memory system 100B is within a second erase count interval, and in an expected life end stage of the life cycle of the memory system 100B; and in this stage, the memory system 100B has approached or reached an upper limit of design life, the performance may have begun to degrade, and the risk of data loss may also increase. In the Erase Count light control method, the EOL mode may correspond to the yellow indicator lamp. The Read Only mode indicates that the erase count of the memory system 100B is in a third erase count interval, and has entered a read-only state. When the Erase Count of the memory system 100B reaches a preset threshold or the memory system 100B cannot perform a write operation any more due to other reasons (e.g., firmware errors, hardware failure, etc.), the memory system 100B may automatically switch to a read-only mode. In this mode, the user may still read data in the memory system 100B, but cannot write new data or modify existing data. Therefore, the data stored in the memory system 100B is protected from being further damaged or lost. In the Erase Count light control method, when the memory system 100B enters the Read Only mode, the indicator lamp may correspond to the red indicator lamp. In this example, the Erase Count corresponding to the first erase count interval, the second erase count interval, and the third erase count interval is incremented sequentially. The user or the system administrator is notified with the current state of the memory system 100B through different colors displayed by the indicator lamp.

Further, in some scenarios, in order to show the erase count state of the memory system 100B with finer granularity, the life cycle of the memory system 100B may be divided into more modes, and the indicator lamp may display the erase count state of the memory system 100B through more complex combination modes. In this example, the erase count state of the memory system 100B is indicated by means of combining the color and the flicker frequency of the indicator lamp. Different colors of the indicator lamp correspond to the erase count state information in different count intervals. Different flicker frequencies of the indicator lamp correspond to the erase count state information of different count gradient ranges in the same count interval. For example, the life cycle of the memory system 100B is divided into four modes of BOL, EOL, Not Read Only, and Read Only according to the Erase Count. Herein, the BOL mode indicates that the erase count of the memory system 100B is in the first erase count interval, and the first erase count interval comprises different sub-erase count intervals. In this stage, the BOL mode may correspond to the green indicator lamp, and uses different flicker frequencies to indicate different sub-erase count intervals. The EOL mode indicates that the erase count of the memory system 100B is in the second erase count interval, and the second erase count interval comprises different sub-erase count intervals. In this stage, the EOL mode may correspond to the yellow indicator lamp, and uses different flicker frequencies to indicate different sub-erase count intervals. The Not Read Only mode indicates that the erase count of the memory system 100B is in the third erase count interval, and the third erase count interval comprises different sub-erase count intervals. In this stage, the life cycle of the memory system 100B reaches a critical state of the upper limit of design life, but it is still possible to dutifully erase the memory system 100B. In the Erase Count light control method, the Not Read Only mode may correspond to the red indicator lamp, and uses different flicker frequencies to indicate different sub-erase count intervals. The Read Only mode indicates that the erase count of the memory system 100B is in a fourth erase count interval, and has entered the read-only state. When the memory system 100B enters the Read Only mode, the indicator lamp may correspond to the red indicator lamp and be on for a long time. In this example, the Erase Count corresponding to the first erase count interval, the second erase count interval, the third erase count interval, and the fourth erase count interval is incremented sequentially. The flicker frequency corresponding to a sub-interval in each interval is positively correlated to the Erase Count.

Figure 4:
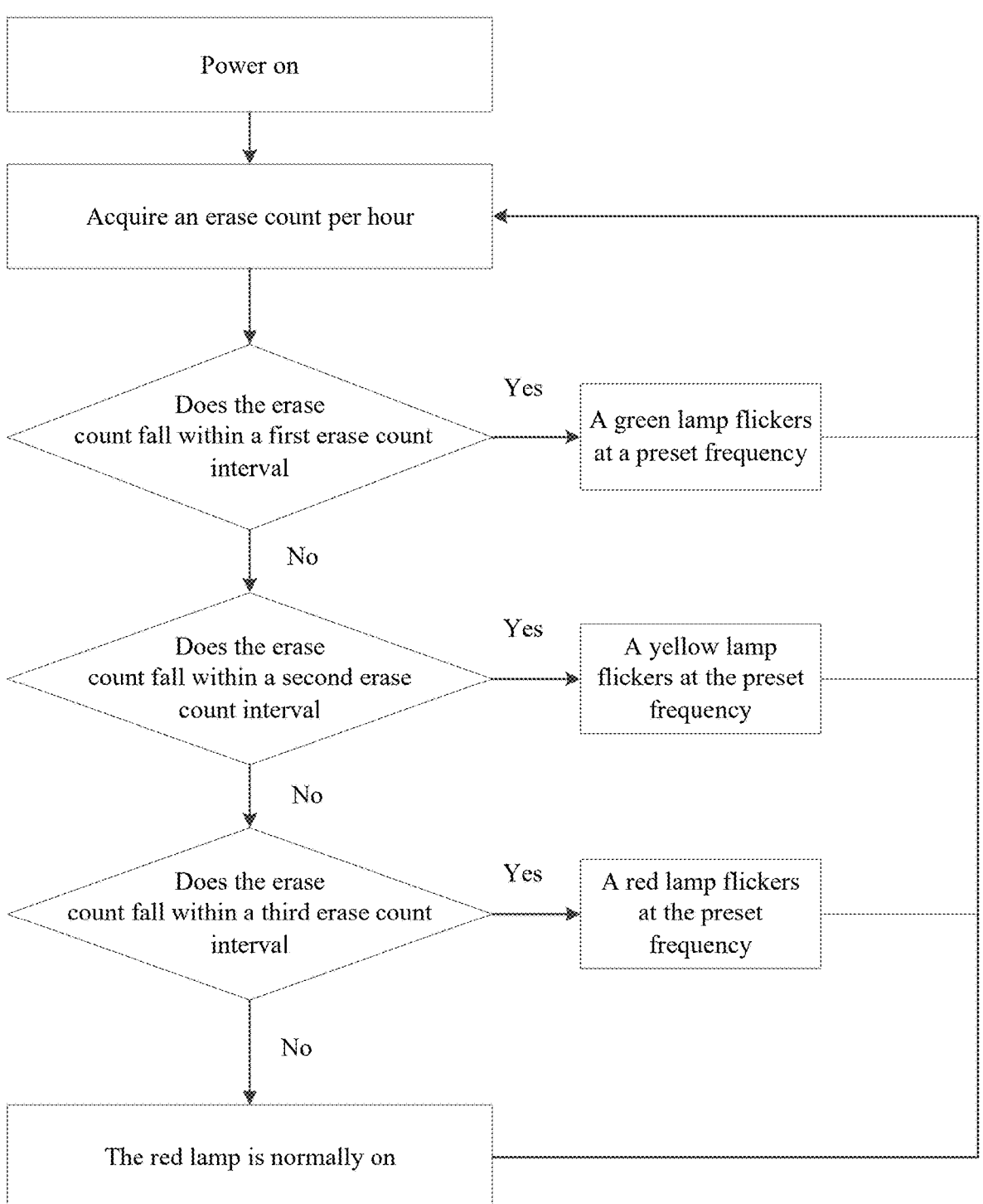
FIG. 4 is a flow diagram II of a control method according to some examples.
Figure 5:
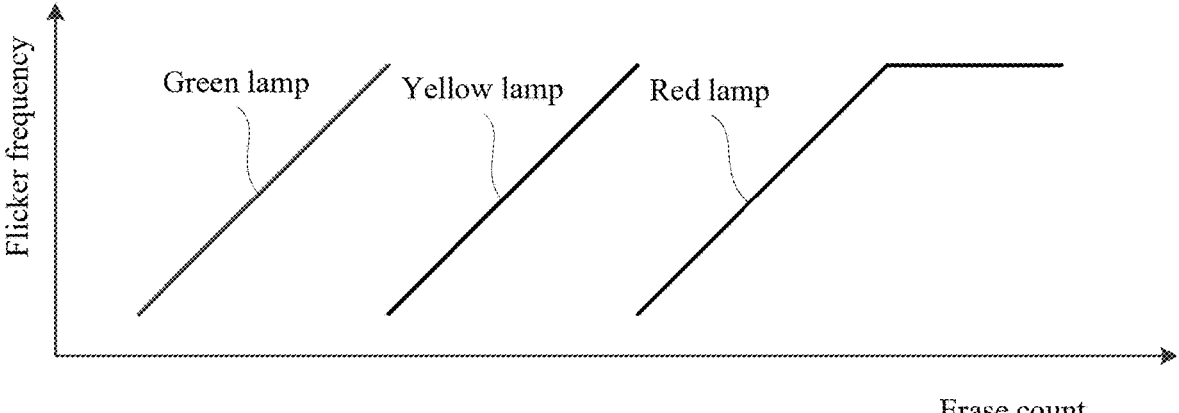
FIG. 5 is a diagram of a relationship between an erase count and a color and flicker frequency of a display structure according to some examples.

Further, the specific Erase Count light control method is shown in FIG. 4. After the memory system 100B is powered on, the memory system 100B acquires the Erase Count per hour; the Erase Count is compared with the first erase count interval, when the Erase Count falls within one sub-erase count interval in the first erase count interval, the state indication signal is sent to the display structure 211B to control a green lamp in the display structure 211B to turn on and flicker according to a frequency corresponding to the sub-erase count interval, as shown in FIG. 5. If the Erase Count does not fall within the first erase count interval, the Erase Count is compared with the second erase count interval, when the Erase Count falls within one sub-erase count interval in the second erase count interval, the state indication signal is sent to the display structure 211B to control a yellow lamp in the display structure 211B to turn on and flicker according to the frequency corresponding to the sub-erase count interval, as shown in FIG. 5. If the Erase Count does not fall within the second erase count interval, the Erase Count is compared with the third erase count interval, when the Erase Count falls within one sub-erase count interval in the third erase count interval, the state indication signal is sent to the display structure 211B to control a red lamp in the display structure 211B to turn on and flicker according to the frequency corresponding to the sub-erase count interval, as shown in FIG. 5. If the Erase Count does not fall within the third erase count interval, the state indication signal is sent to the display structure 211B to control the red lamp in the display structure 211B to be normally on, as shown in FIG. 5, which indicates that the Erase Count falls within the fourth erase count interval (the red lamp being normally on in FIG. 4 indicating that the Erase Count falls within the fourth erase count interval). In the examples, the BOL, EOL, Not Read Only, and Read Only in the Erase Count light control method respectively identify different erase count states of the memory system 100B, and transmit the current state information of the memory system 100B to the user or the system administrator through changes in the flicker frequency and color of the indicator lamp. The information helps the user to timely understand the erase count state of the memory system 100B. Meanwhile, the flicker mode of the indicator lamp is easy to observe and understand, such that flicker modes that are too complex and difficult to recognize are prevented from causing problems for the user.

In an example, for example, the indicator lamp in the display structure 211B is configured to show the read/write state information, the abnormal state information, and the error state information of the memory system 100B. When the memory system 100B is performing data reading or writing, the indicator lamp may be set to flicker with a certain frequency. Such flickering indicates that a hard disk is busy and processes data reading-writing operations. Different flicker frequencies may represent different read/write rates or working states. For example, fast flickering may indicate that high speed data transmission is in progress, and slow flickering may indicate that a read/write speed is relatively slow or small amount of data transmission is in progress. Alternatively, the indicator lamp is set to indicate different states by employing light with different colors. In a read/write state, the indicator lamp may maintain a color such as green, blue, or the like, so as to indicate that the hard disk is functioning normally. If other colors such as red or yellow appear, it may indicate that there is an error (error state information) or warning information (abnormal state information) in the hard disk, and attention needs to be paid by the user. In some cases, the indicator lamp may be set to maintain a normally-on state during reading and writing, instead of flickering. This indicates that the hard disk is undergoing continuous read/write operations, and has no idle time. Thus, the user visually understands a current working state of the hard disk. A simple light display solution is extremely-low in cost and diverse in implemented function compared to a complex external display device solution.

In an example, when the display structure 211B comprises at least one display screen, the at least one display screen indicates the working state information of the memory system 100B by means of a number or a symbol.

In an example, contact functions on the memory system 100B may be flexibly configured, such that a light control signal may be transmitted, and various functions of fan speed regulation, data transmission, etc. may also be realized, thereby realizing backward compatibility. Function changes only need to change firmware logic without changing hardware, and only firmware upgrade may continue to give the user continuous function updates.

In an example, control buttons may be provided on the heat dissipation device 200B, are coupled with the memory system 100B, and are configured to generate input instructions by the user through the control buttons.

In some possible implementations, the memory system 100B may also, based on requirements of the user for key state display of the memory system 100B (which may select, but not limited to, to display one of the erase count state, the read/write state, an abnormal state, an error state, etc.), select show operations according to the user, and control the display structure 211B to show different internal key states of the memory system 100B, i.e., realizing the switching of different key state information.

In some examples, as shown in FIG. 3, the memory system 100B may be set to display working state information by default when power-on. For example, default working state information may be displayed by controlling the display structure 211B through a first state indication signal, wherein the first state indication signal may refer to, but not limited to, any one of the erase count state information, the read/write state information, and the abnormal state information. After the memory system 100B is powered on, a show information display selection module sends the first state indication signal to the heat dissipation device through the first interface coupling structure 112B, so as to control the display structure 211B to display the default working state information. When the user wants to check other working state information in the memory system 100B, the user inputs an instruction, the memory system 100B, in response to an input instruction of the user, sends a second state indication signal to the heat dissipation device through the first interface coupling structure 112B; and the second state indication signal may be any one of the following working state information: the erase count state information, the read/write state information, and the abnormal state information. However, the first state indication signal and the second state indication signal indicate different working state information. The input instruction is from a host controller.

In some examples, as shown in FIG. 3, the memory system 100B periodically detects, through the show information display selection module, whether a display module has changed, and timely controls and updates display state of the display structure 211B. The memory system 100B can still accurately, actively, and externally show the working state information of various memory systems 100B when the heat dissipation device 200B is mounted, and may randomly perform configuration. The user does not need to check with particular software. When discovering a problem, the user may stop loss by taking active measures timely.

In some examples, the display structure 211B receives the first state indication signal from the memory system 100B through the second interface coupling structure 212B; controls, according to the first state indication signal, at least one of the color or the flicker frequency of the at least one indicator lamp to be in a first display state, wherein the first display state is configured to indicate any one of the following working state information of the memory system 100B: the erase count state information, the read/write state information, and the abnormal state information; receives a second state indication signal from the memory system 100B through the second interface coupling structure 212B, wherein the second state indication signal is configured to indicate any one of the following working state information of the memory system 100B: the erase count state information, the read/write state information, and the abnormal state information, and the first state indication signal and the second state indication signal indicate different working state information; and according to the second state indication signal, switches the at least one of the color or the flicker frequency of the at least one indicator lamp to be in a second display state, wherein the second display state is configured to indicate any one of the following working state information of the memory system 100B: the erase count state information, the read/write state information, and the abnormal state information. The first display state and the second display state indicate that the working state information of the memory system 100B is different.

Figure 6:
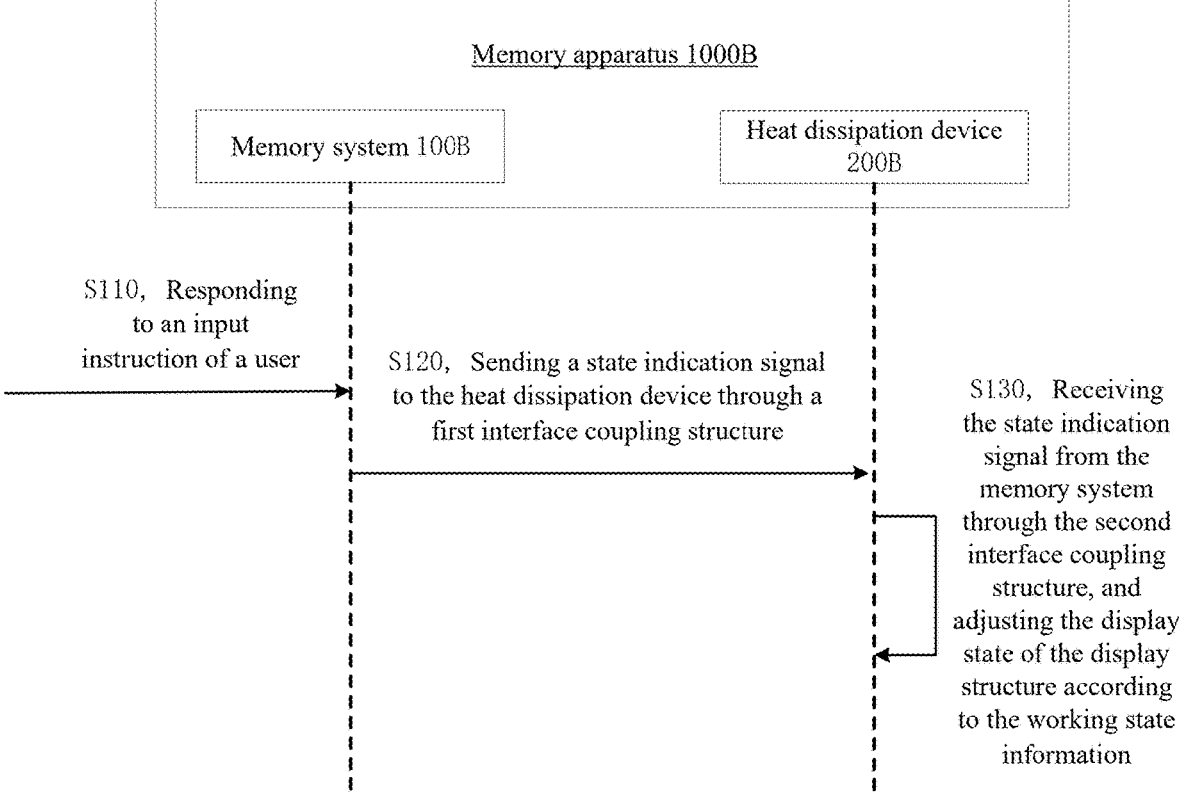
FIG. 6 is a flow diagram III of a control method according to some examples.

Examples of the present disclosure provide a control method. The control method is performed based on the memory apparatus 1000B of the structure shown in FIG. 2. As shown in FIG. 6, the control method comprises the following operations S110-S130:

S110, responding to an input instruction of a user.

In some examples, the input instruction is configured to power on and start the memory apparatus, or the input instruction is configured to realize the switching of different working state information.

In some examples, the input instruction is from a host controller, or control buttons are provided on the heat dissipation device 200B and are coupled with the memory system 100B, and the input instruction is generated by the user through the control buttons.

S120, sending a state indication signal to the heat dissipation device through a first interface coupling structure.

In some examples, in the memory apparatus 1000B shown in FIG. 2, the memory system 100B sends the state indication signal to a second interface coupling structure 212B of the heat dissipation device 200B through the first interface coupling structure 112B, and the state indication signal is configured to indicate working state information of the memory system 100B. The heat dissipation device 200B receives the state indication signal from the memory system 100B through the second interface coupling structure 212B, and adjusts a display state of the display structure 211B according to the working state information; and the display state of the display structure 211B is configured to indicate the working state information of the memory system 100B.

S130, receiving the state indication signal from the memory system through the second interface coupling structure, and adjusting the display state of the display structure according to the working state information.

In some examples, when the input instruction is configured to realize the switching of different working state information, the state indication signal comprises a first state indication signal, and the first state indication signal may be, but not limited to, configured to indicate any one of the following working state information: the erase count state information, the read/write state information, and the abnormal state information. In the memory apparatus 1000B shown in FIG. 2, the heat dissipation device 200B receives the first state indication signal from the memory system 100B through the second interface coupling structure 212B, and controls, according to the first state indication signal, at least one of the color or the flicker frequency of the at least one indicator lamp to be in a first display state. The first display state corresponds to the first state indication signal, and is configured to indicate any one of the following working state information of the memory system: the erase count state information, the read/write state information, and the abnormal state information. The memory system 100B, in response to the input instruction of the user, sends a second state indication signal to the heat dissipation device 200B through the first interface coupling structure 112B, wherein the second state indication signal may be, but not limited to, configured to indicate any one of the following working state information of the erase count state information, the read/write state information, and the abnormal state information. However, the first state indication signal and the second state indication signal indicate different working state information. The heat dissipation device 200B, according to the second state indication signal, switches the at least one of the color or the flicker frequency of the at least one indicator lamp to be in a second display state, and the second display state is configured to indicate any one of the following working state information of the memory system 100B: the erase count state information, the read/write state information, and the abnormal state information. However, the first display state and the second display state indicate that the working state information of the memory system 100B is different.

Examples of the present disclosure provide a memory system, a heat dissipation device, and a control method. By disposing the display structure 211B on the heat spreader 210B, a user is facilitated to observe a working state of the memory apparatus 1000A. The memory system 100B is coupled with the elastic metal reed of the second interface coupling structure 212B through the metal contact of the first interface coupling structure 112B without extra routing added, on the one hand, which on the one hand facilities the disassembly of the heat dissipation device 200B, avoiding complexity and inconvenience of routing caused by the addition of external routing, thereby improving the appearance aesthetics and neatness of the memory apparatus 1000A. On the other hand, a contact type circuit structure of the metal contact and the elastic metal reed avoids the risk of poor contact due to wear and tear of a plug-in coupling structure caused by repeated plugging and unplugging. Meanwhile, there is no movable wiring, facilitating the usage of the user. Compared with a complex connection circuit, the risk of failure of the memory apparatus 1000A that may be caused by external routing fault is avoided, thereby improving the reliability and stability of the working performance of the memory apparatus 1000A.

Figure 7:
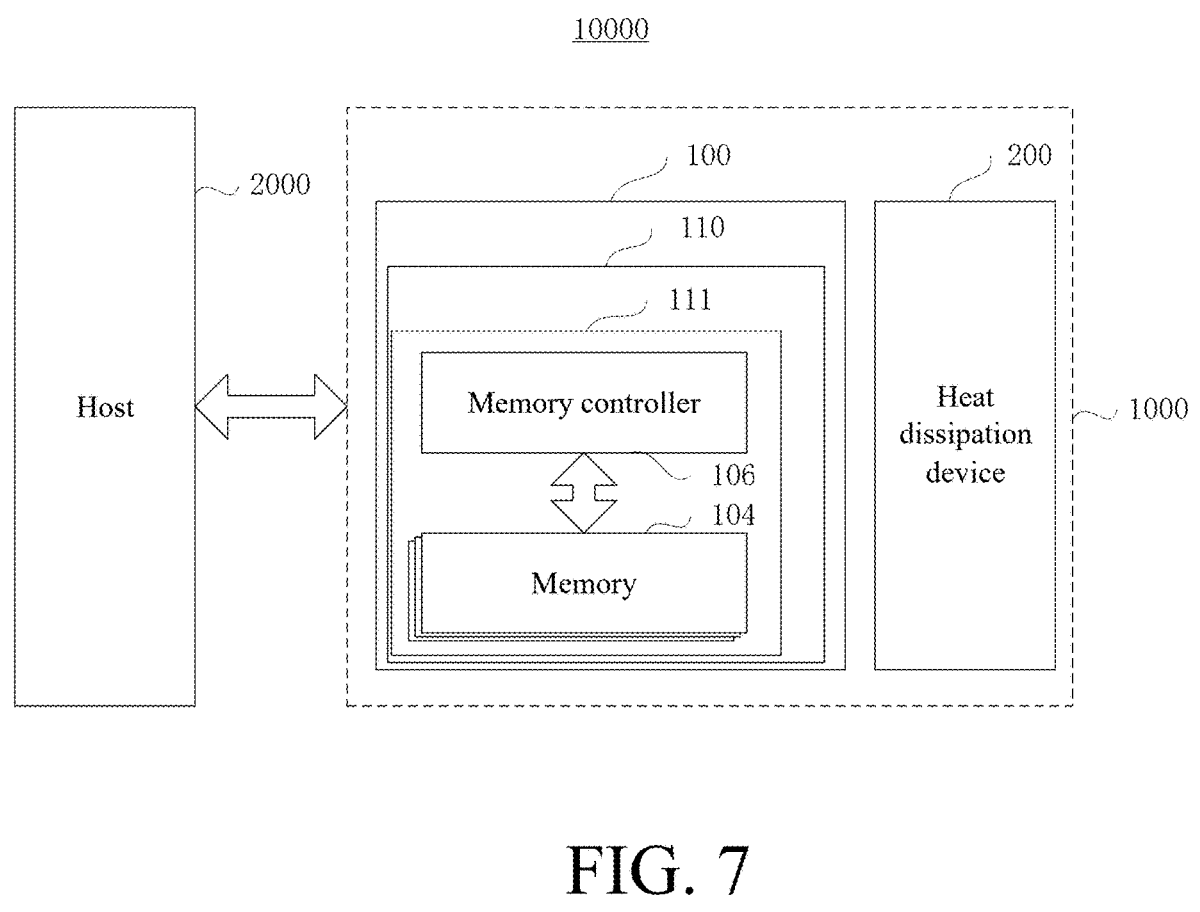

The memory apparatus 1000 (the memory apparatus 1000A or the memory apparatus 1000B) provided by the examples of the present disclosure may be applied to and packaged into different types of electronic apparatuses, such as a mobile phone (e.g., a cellphone), a desktop computer, a tablet computer, a notebook computer, a server, a vehicle apparatus, a gaming console, a printer, a positioning apparatus, a wearable apparatus (e.g., a smart watch, a smart wristband, smart glasses, etc.), a smart sensor, a mobile power supply, a Virtual Reality (VR) apparatus, an Augmented Reality (AR) apparatus, or any other suitable electronic apparatuses having memories therein. As shown in FIG. 7, the electronic apparatus 10000 may comprise a memory apparatus 1000 and a host 2000, wherein the memory apparatus 1000 comprises a memory system 100 (a memory system 100A or a memory system 100B) and a heat dissipation device 200 (a heat dissipation device 200A or a heat dissipation device 200B). A memory device 111 (a memory device 111A or a memory device 111B) in the memory system 100 is provided with one or more memories 104 and a memory controller 106. The host 2000 may be a processor of the electronic apparatus (such as a Central Processing Unit (CPU), or a System on Chip (SoC) (such as an Application Processor (AP)). The host 2000 may be configured to send or receive data to or from the memory 104.

According to some implementations, the memory controller 106 is coupled to the memory 104 and the host 2000, and is configured to control the memory 104. The memory controller 106 may manage data stored in the memory 104, and communicate with the host 2000. In some implementations, the memory controller 106 is designed for operating in a low duty-cycle environment, such as Secure Digital (SD) cards, Compact Flash (CF) Cards, Universal Serial Bus (USB) flash drives, or other media for use in electronic apparatuses, such as personal computers, digital cameras, mobile phones, etc. In some implementations, the memory controller 106 is designed for operating in a high duty-cycle environment of such as SSD or Embedded Multi Media Cards (eMMC) used as data memory apparatuses for mobile electronic apparatuses, such as smartphones, tablet computers, personal computers, etc., and enterprise memory arrays. The memory controller 106 may be configured to control operations of the memory 104, such as read, erase, and program operations. The memory controller 106 may further be configured to manage various functions with respect to data stored or to be stored in the memory 104, including, but not limited to, bad-block management, garbage collection, logical-to-physical address translation, wear leveling, etc. In some implementations, the memory controller 106 is further configured to process error correction codes (ECCs) with respect to the data read from or written to the memory 104. The memory controller 106 may further perform any other suitable functions, for example, formatting the memory 104. The memory controller 106 may communicate with an external apparatus (e.g., the host 2000) according to a specific communication protocol. For example, the memory controller 106 may communicate with external apparatuses through at least one of various interface protocols, such as a USB protocol, a MultiMedia Card (MMC) protocol, a Peripheral Component Interconnect (PCI) protocol, a PCI Express (PCI-E) protocol, an Advanced Technology Attachment (ATA) protocol, a serial-ATA protocol, a parallel-ATA protocol, a Small Computer System Interface (SCSI) protocol, an Enhanced Small Device Interface (ESDI) protocol, an Integrated Drive Electronics (IDE) protocol, a Firewire protocol, etc.

Figure 8:
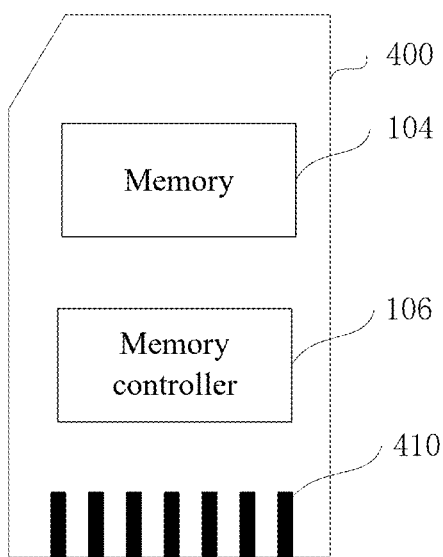
FIG. 8 is a schematic module diagram of a memory card according to some examples.
Figure 9:
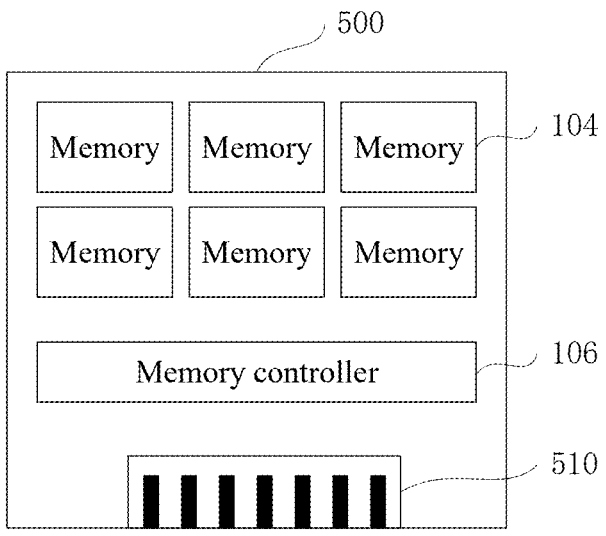
FIG. 9 is a schematic module diagram I of a solid state drive according to some examples.

The memory controller 106 and the one or more memories 104 may be integrated into various types of memory apparatuses, for example, be comprised in the same package (such as a Universal Flash Storage (UFS) package or an eMMC package). That is to say, the memory apparatus 1000 may be implemented and packaged into different types of final electronic products. In one example shown in FIG. 8, the memory controller 106 and the single memory 104 may be integrated into a memory card 400. The memory card 400 may comprise a PC card (personal computer memory card international association, PCMCIA), a CF card, a smart media (SM) card, a memory stick, a multimedia card (MMC, RS-MMC, MMCmicro), an SD card (SD, miniSD, microSD, SDHC), a UFS, etc. The memory card 400 may further comprise a memory card connector 410 coupling the memory card 400 with a host (e.g., the host 2000 in FIG. 7). In another example shown in FIG. 9, the memory controller 106 and the plurality of memories 104 may be integrated into an SSD 500. The SSD 500 may further comprise an SSD connector 410 coupling the SSD 500 with a host (e.g., the host 2000 in FIG. 7). In some implementations, a storage capacity and/or operation speed of the SSD 500 is higher than a storage capacity and/or operation speed of the memory card 400.

Figure 10:
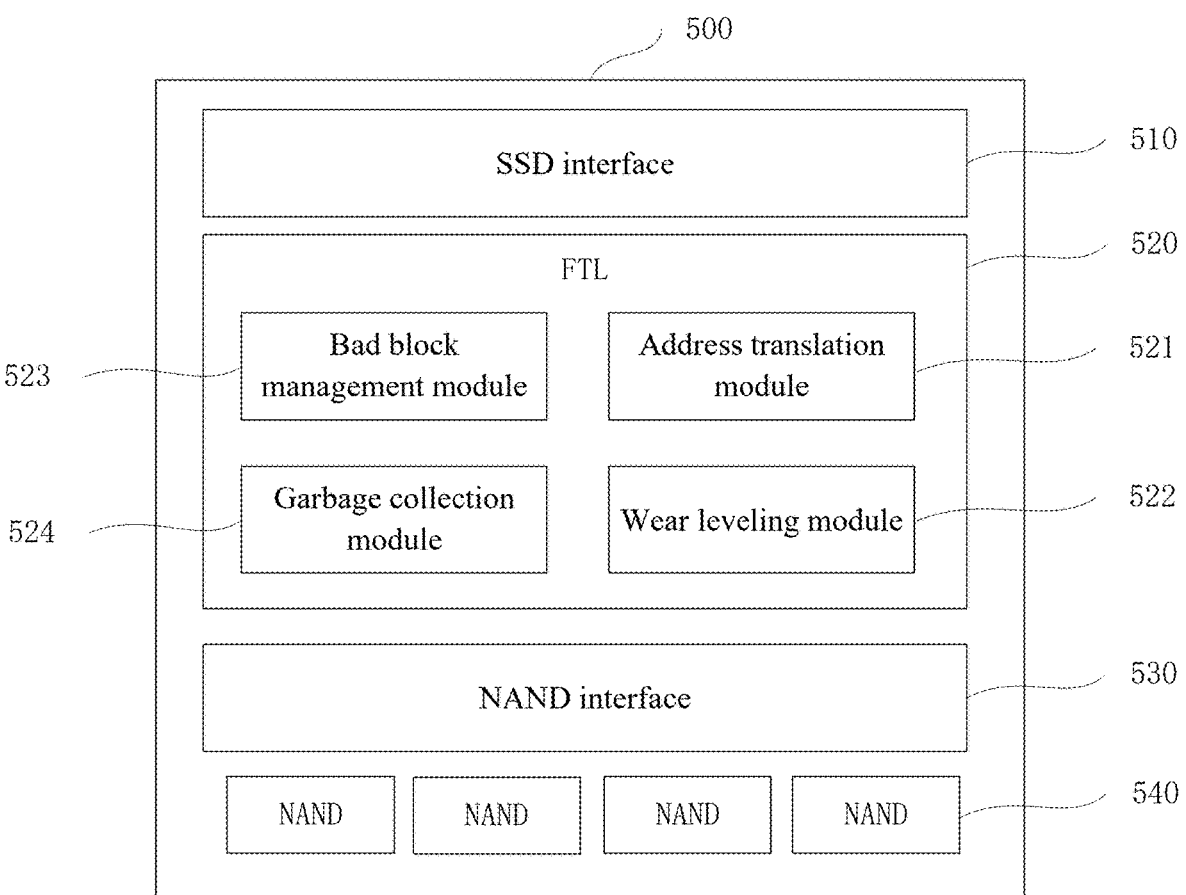
FIG. 10 is a schematic module diagram II of a solid state drive according to some examples.

FIG. 10 shows an architecture diagram of the SSD 500. The SSD 500 comprises an SSD interface 510 (a front end interface), which is coupled with the host 2000; and a Flash Translation Layer (FTL) 520, wherein the memory controller 106 may drive Firewire of the flash translation layer 520 to control an address translation module 521, a wear leveling module 522, a bad block management module 523, a garbage collection module 524, etc. to realize functions such as address translation, wear leveling, garbage collection, bad block management, etc. A NAND interface 530 (a rear end interface) is configured to perform a data interaction with a NAND 540.

Figure 11:
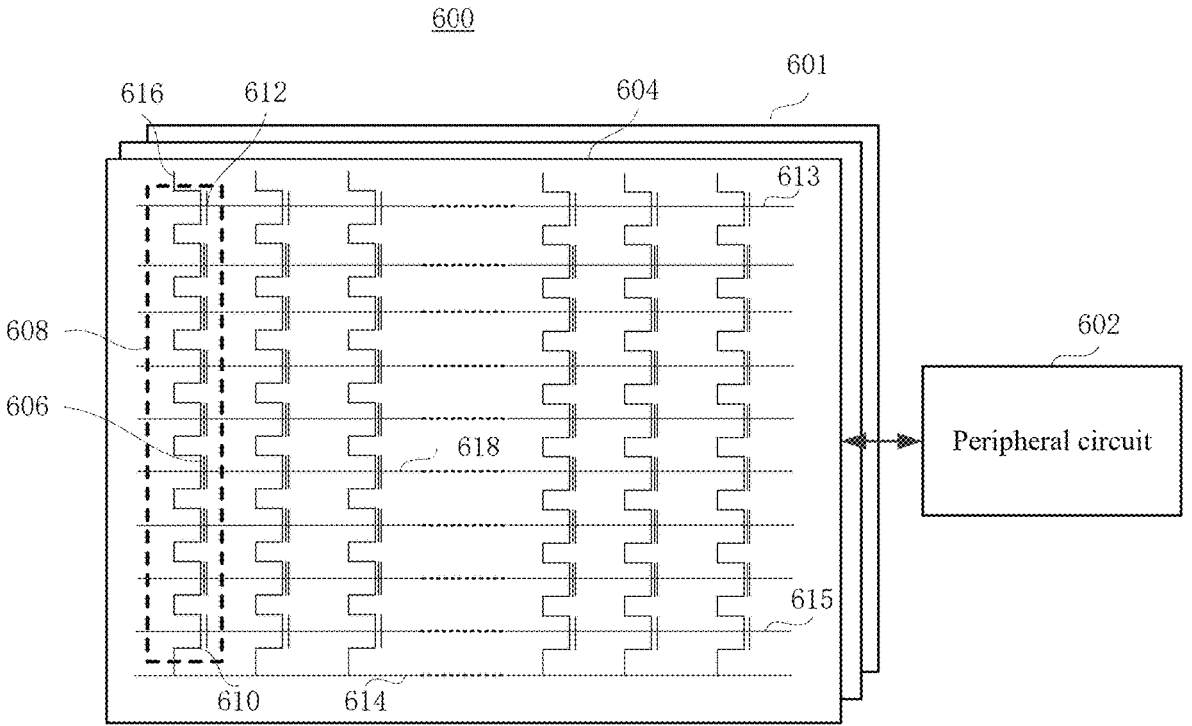
FIG. 11 is a schematic diagram I of a memory according to some examples.

FIG. 11 shows a schematic circuit diagram of an example memory 600 comprising a peripheral circuit according to some aspects of the present disclosure. The memory 600 may be an example of the memory 104 in FIG. 7. The memory 600 may comprise a memory cell array 601 and a peripheral circuit 602 coupled to the memory cell array 601. The memory cell array 601 may be a NAND flash memory cell array, wherein a memory cell 606 is provided in the form of an array of NAND memory strings 608 extending vertically over a substrate (not shown). In some implementations, each NAND memory string 608 comprises the plurality of memory cells 606 coupled in series and stacked vertically. Each memory cell 606 can maintain a continuous analog value, such as voltage or charge, which depends on the number of electrons trapped within a region of the memory cells 606. Each memory cell 606 may be either a floating gate type memory cell comprising a floating gate transistor, or a charge trapping type memory cell comprising a charge trapping transistor.

In some implementations, each memory cell 606 is a Single-Level Cell (SLC) that has two possible memory states (levels) and thus can store one bit of data. For example, a first memory state "0" may correspond to a threshold voltage in a first range, and a second memory state "1" may correspond to a threshold voltage in a second range. In some implementations, each memory cell 606 is an xLC that can store more than one bit of data in more than four memory states (levels). For example, the xLC can store two bits (Multi-Level Cell (MLC) per unit, store three bits (Triple-Level Cell (TLC) per unit, or store four bits (Quad-Level Cell (QLC) per unit. Each xLC may be programmed to assume a certain range of possible nominal storage values (i.e., 2N segments of N-bit data, such as a Gray code). In one example, the MLC may be programmed to assume one of three possible program levels from an erased state by writing one of three possible nominal storage values to a cell. A fourth nominal storage value may be used for the erased state.

As shown in FIG. 11, each NAND memory string 608 may further comprise a Source Select Gate (SSG) transistor 610 at a source terminal of the memory string and a Drain Select Gate (DSG) transistor 612 at a drain terminal of the memory string. The SSG transistor 610 and the DSG transistor 612 may be configured to activate a selected NAND memory string 608 (a column of an array) during read and program operations. In some implementations, sources of the NAND memory strings 608 in a same block 604 are coupled through a same source line (SL) 614, e.g., common Source Lines (SLs). In other words, according to some implementations, all the NAND memory strings 608 in the same block 604 have an Array Common Source (ACS). According to some implementations, the drain of each NAND memory string 608 is coupled to a respective bit line 616, and data can be read or written from the respective bit line 616 via an output bus (not shown). In some implementations, each NAND memory strings 608 is configured to be selected or unselected by applying a select voltage or an unselect voltage to a gate of the respective DSG transistor 612 via one or more DSG lines 613 and/or by applying a select voltage or an unselect voltage to a gate of the respective SSG transistor 610 via one or more SSG lines 615.

Figure 12:
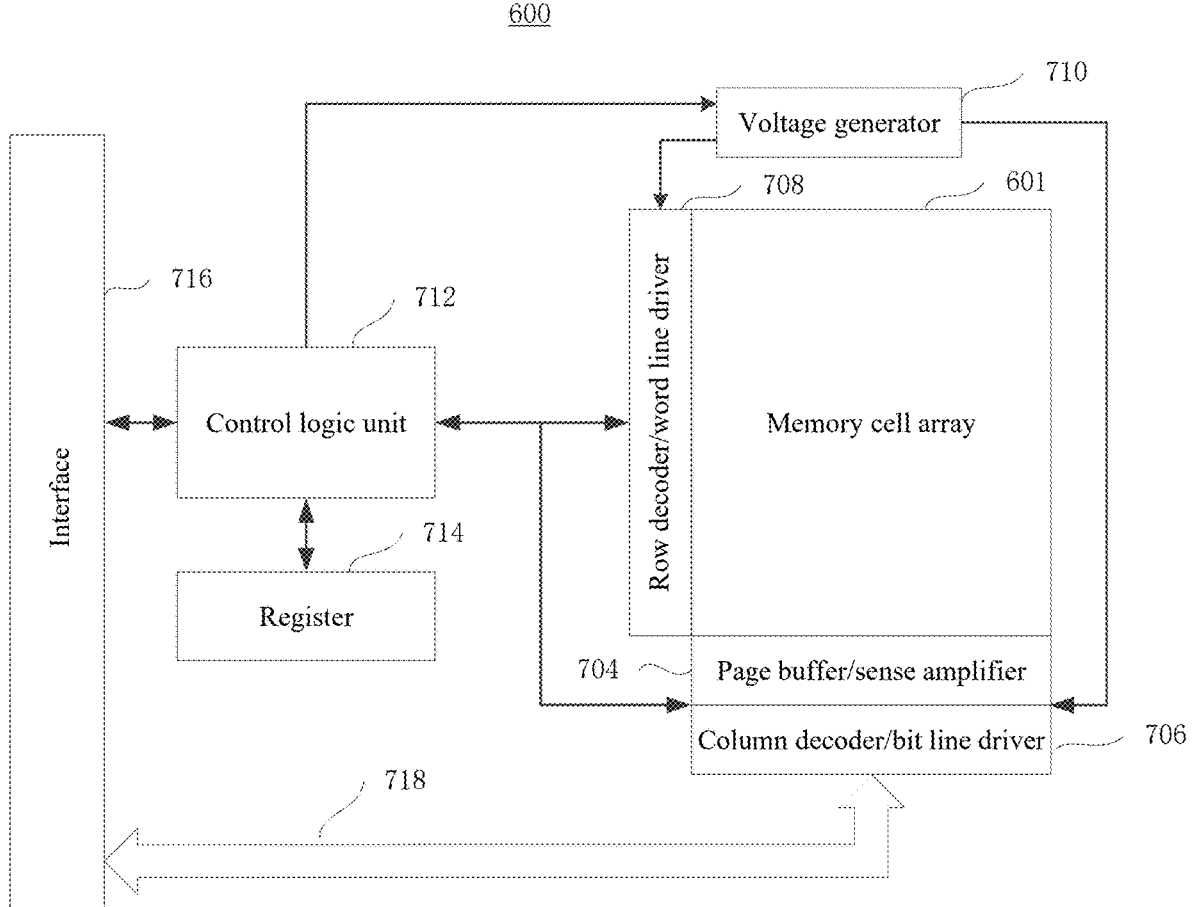
FIG. 12 is a schematic diagram II of a memory according to some examples.

As shown in FIG. 11, the NAND memory strings 608 may be organized into a plurality of blocks 604, and each of the blocks 604 may have a common source line 614, e.g., coupled to the ACS. In some implementations, each block 604 is a basic data unit for an erase operation, i.e., all of the memory cells 606 on the same block 604 are erased at the same time. In order to erase the memory cells 606 in a selected block 604, the source lines 614 coupled to the selected block 604 as well as unselected blocks 604 that are in a same plane as the selected block 604 may be biased with an erase voltage (Vers) such as a high positive bias voltage (e.g., 20 V or higher). The memory cells 606 of adjacent ones of the NAND memory strings 608 may be coupled through a word line 618 that selects which row of memory cells 606 is affected by the read and program operations. The peripheral circuit 602 may be coupled to the memory cell array 601 through the bit line 616, the word line 618, the source line 614, the SSG line 615, and the DSG line 613. The peripheral circuit 602 may comprise any suitable analog, digital, and hybrid signal circuits for promoting the operations of the memory cell array 601 by applying and sensing voltage signals and/or current signals to and from each target memory cell 606 via the bit line 616, the word line 618, the source line 614, the SSG line 615, and the DSG line 613. The peripheral circuit 602 may comprise various types of peripheral circuits formed using a metal-oxide-semiconductor (MOS) technology. For example, FIG. 12 shows some example peripheral circuits, comprising a page buffer/sense amplifier 704, a column decoder/Bit Line (BL) driver 706, a row decoder/Word Line (WL) driver 708, a voltage generator 710, a control logic unit 712, a register 714, an interface 716, and a data bus 718. It is to be understood that, additional peripheral circuits not shown in FIG. 12 may also be comprised as well.

The page buffer/sense amplifier 704 may be configured to read and program (write) data from and to the memory cell array 601 according to a control signal from the control logic unit 712. In another example, the page buffer/sense amplifier 704 may perform a program verification operation to ensure that the data has been properly programmed into the memory cell 606 coupled to the selected word line 618. In yet another example, the page buffer/sense amplifier 704 may also sense, in the read operation, a low power signal from the bit line 616 that represents a data bit stored in the memory cell 606, and amplifies a small voltage swing to a recognizable logic level. As described in detail below and consistent with the scope of the present disclosure, in the program operation, the page buffer/sense amplifier 704 may comprise a storage module (e.g., a latch, a cache, a register, etc.), and is configured to temporarily store a segment of N-bit (e.g., in the form of a Gray code) received from the data bus 718, and provide the segment of N-bit data to the corresponding target memory cell 606 through the corresponding bit line 616 in each of the plurality of program operations using $2^N$-$2^N$ solutions.

The column decoder/bit line driver 706 may be configured to be controlled by the control logic unit 712, and select one or more NAND memory strings 608 by applying a bit line voltage generated by the voltage generator 710. The row decoder/word line driver 708 may be configured to be controlled by the control logic unit 712, select/unselect the blocks 604 of the memory cell array 601, and select/unselect the word lines 618 of the blocks 604. The row decoder/word line driver 708 may further be configured to drive the word lines 618 using a word line voltage generated by the voltage generator 710. In some implementations, the row decoder/word line driver 708 may also select/unselect and drive the SSG line 615 and the DSG line 613. The voltage generator 710 may be configured to be controlled by the control logic unit 712, and generate the word line voltage (such as, a read voltage, a program voltage, a pass voltage, a local voltage, a verify voltage, etc.), the bit line voltage, and a source line voltage, which are to be supplied to the memory cell array 601.

The control logic unit 712 may be coupled to each peripheral circuit described above and configured to control operations of each peripheral circuit. The register 714 may be coupled to the control logic unit 712 and comprise a state register, a command register, and an address register, so as to store state information, command Operation Codes (OP), and command addresses for controlling the operations of each peripheral circuit. The interface 716 may be coupled to the control logic unit 712, and act as a control buffer to buffer and forward control commands received from a host (e.g., the host 2000 in FIG. 7) to the control logic unit 712 and state information received from the control logic unit 712 to the host. The Interface (I/F) 716 may also be coupled to the column decoder/bit line driver 706 via the data bus 718 and act as a data input/output (I/O) interface and a data buffer to buffer and forward the data to and from the memory cell array 601.

Examples of the present disclosure provide a memory system, a heat dissipation device, and a control method, to facilitate a user to observe a working state of the memory system.

In order to achieve the above-mentioned objective, examples of the present disclosure employ the following technical solutions:

In a first aspect, examples of the present disclosure provide a memory system, comprising: a circuit board on which a memory device and a first interface coupling structure are provided. The memory device is coupled with the first interface coupling structure. The memory device is configured to: send a state indication signal to a heat dissipation device through the first interface coupling structure, wherein the state indication signal is configured to indicate working state information of the memory system.

In some possible implementations, the state indication signal comprises a first state indication signal, and the first state indication signal is configured to indicate any one of the following working state information: erase count state information, read/write state information, and abnormal state information.

In some possible implementations, the memory device is configured to: send a first state indication signal to a heat dissipation device through the first interface coupling structure; and in response to an input instruction of a user, send a second state indication signal to the heat dissipation device through the first interface coupling structure, wherein the second state indication signal is configured to indicate any one of the following working state information: erase count state information, read/write state information, and abnormal state information. The first state indication signal and the second state indication signal indicate different working state information.

In some possible implementations, the input instruction is from a host controller.

In some possible implementations, the first interface coupling structure comprises one or more metal contacts.

In a second aspect, examples of the present disclosure provide a heat dissipation device, comprising: a heat spreader on which a display structure is provided on a first side, and a second interface coupling structure is provided on a second side. The display structure is coupled with the second interface coupling structure. The display structure is configured to: receive a state indication signal from a memory system through the second interface coupling structure, wherein the state indication signal is configured to indicate working state information of the memory system; and adjust a display state of the display structure according to the working state information, wherein the display state of the display structure is configured to indicate the working state information of the memory system.

In some possible implementations, the display structure comprises at least one indicator lamp; and the display structure is configured to: change a state of the at least one indicator lamp according to the state indication signal, wherein the state of the indicator lamp comprises at least one of the following: a color or a flicker frequency. The state of the at least one indicator lamp is configured to indicate different working state information of the memory system.

In some possible implementations, the state indication signal comprises a first state indication signal, and the first state indication signal is configured to indicate any one of the following working state information: erase count state information, read/write state information, and abnormal state information.

In some possible implementations, the display structure is configured to: receive the first state indication signal from the memory system through the second interface coupling structure; control, according to the first state indication signal, at least one of the color or the flicker frequency of the at least one indicator lamp to be in a first display state, wherein the first display state is configured to indicate any one of the following working state information of the memory system: the erase count state information, the read/write state information, and the abnormal state information; receive a second state indication signal from the memory system through the second interface coupling structure, wherein the second state indication signal is configured to indicate any one of the following working state information of the memory system: the erase count state information, the read/write state information, and the abnormal state information, and the first state indication signal and the second state indication signal indicate different working state information; and according to the second state indication signal, switch the at least one of the color or the flicker frequency of the at least one indicator lamp to be in a second display state, wherein the second display state is configured to indicate any one of the following working state information of the memory system: the erase count state information, the read/write state information, and the abnormal state information. The first display state and the second display state indicate that the working state information of the memory system is different.

In some possible implementations, different colors of the at least one indicator lamp correspond to the erase count state information in different count intervals. Different flicker frequencies of the at least one indicator lamp correspond to the erase count state information of different count gradient ranges in the same count interval.

In some possible implementations, the display structure comprises at least one display screen. The at least one display screen is configured to: indicate the working state information of the memory system by means of a number or a symbol.

In some possible implementations, the second interface coupling structure comprises one or more elastic metal reeds.

In a third aspect, examples of the present disclosure provide a memory apparatus, comprising: any memory system as in the first aspect and any heat dissipation device as in the second aspect. The memory system is coupled with a second interface coupling structure of the heat dissipation device through a first interface coupling structure.

In a fourth aspect, examples of the present disclosure provide a control method. The method comprises: sending, by a memory system, a state indication signal to a second interface coupling structure of a heat dissipation device through a first interface coupling structure, wherein the state indication signal is configured to indicate working state information of the memory system; and receiving, by the heat dissipation device, the state indication signal from the memory system through the second interface coupling structure, and adjusting a display state of a display structure according to the working state information, wherein the display state of the display structure is configured to indicate the working state information of the memory system.

In some possible implementations, the display structure comprises at least one indicator lamp; and the display structure changes a state of the at least one indicator lamp according to the state indication signal, wherein the state of the indicator lamp comprises at least one of the following: a color or a flicker frequency. The state of the at least one indicator lamp is configured to indicate different working state information of the memory system.

In some possible implementations, the state indication signal comprises a first state indication signal, and the first state indication signal is configured to indicate any one of the following working state information: erase count state information, read/write state information, and abnormal state information. The control method comprises: receiving, by the heat dissipation device, the first state indication signal from the memory system through the second interface coupling structure; controlling, according to the first state indication signal, at least one of the color or the flicker frequency of the at least one indicator lamp to be in a first display state, wherein the first display state is configured to indicate any one of the following working state information of the memory system: the erase count state information, the read/write state information, and the abnormal state information; in response to an input instruction of a user, sending, by the memory system, a second state indication signal to the heat dissipation device through the first interface coupling structure, wherein the second state indication signal is configured to indicate any one of the following working state information: erase count state information, read/write state information, and abnormal state information, and the first state indication signal and the second state indication signal indicate different working state information; and according to the second state indication signal, switching, by the heat dissipation device, the at least one of the color or the flicker frequency of the at least one indicator lamp to be in a second display state, wherein the second display state is configured to indicate any one of the following working state information of the memory system: the erase count state information, the read/write state information, and the abnormal state information. The first display state and the second display state indicate that the working state information of the memory system is different.

The above is only the implementations of the present disclosure and not intended to limit the scope of protection of the present disclosure. Any variations or replacements that can be easily thought of by those skilled in the art within the technical scope disclosed by the present disclosure shall fall within the scope of protection of the present disclosure. Therefore, the scope of protection of the present disclosure should be defined by the scope of protection of the claims.

What is claimed is:

1. A memory system, comprising a circuit board on which a memory device and a first interface coupling structure are provided, the memory device being coupled with the first interface coupling structure, wherein the memory device is configured to:

send a state indication signal to a heat dissipation device through the first interface coupling structure, wherein the state indication signal is configured to indicate working state information of the memory system, wherein the working state information includes erase count state information; and cause at least one of a color or a flicker frequency of at least one indicator lamp coupled to the heat dissipation device to be in a display state, the display state to indicate the working state information of the memory system, wherein different colors of the at least one indicator lamp correspond to the erase count state information in different count intervals, and different flicker frequencies of the at least one indicator lamp correspond to the erase count state information of different count gradient ranges in the same count interval.

2. The memory system of claim 1, wherein the state indication signal includes a first state indication signal, and the first state indication signal is configured to indicate at least one of read/write state information or abnormal state information.

3. The memory system of claim 2, wherein the memory device is configured to:

send the first state indication signal to the heat dissipation device through the first interface coupling structure; and in response to an input instruction of a user, send a second state indication signal to the heat dissipation device through the first interface coupling structure, wherein the second state indication signal is configured to indicate at least one of the erase count state information, the read/write state information, or the abnormal state information, and the first state indication signal and the second state indication signal indicate different working state information.

4. The memory system of claim 3, wherein the input instruction is from a host controller.

5. The memory system of claim 1, wherein the first interface coupling structure includes one or more metal contacts.

6. A memory apparatus, comprising:

a memory system including a circuit board on which a memory device and a first interface coupling structure are provided, the memory device being coupled with the first interface coupling structure, wherein the memory device is configured to send a state indication signal to a heat dissipation device through the first interface coupling structure, wherein the state indication signal is configured to indicate working state information of the memory system; and the heat dissipation device, including:

a heat spreader;

a display structure being provided on a first side of the heat spreader, the display structure including at least one indicator lamp; and a second interface coupling structure being provided on a second side of the heat spreader, wherein the display structure is coupled with the second interface coupling structure, and wherein the display structure is configured to:

receive the state indication signal from the memory system through the second interface coupling structure, the state indication signal being configured to indicate working state information of the memory system, wherein the working state information includes erase count state information; and adjust at least one of a color or a flicker frequency of the at least one indicator lamp to be in a display state, the display state to indicate the working state information of the memory system, wherein different colors of the at least one indicator lamp correspond to the erase count state information in different count intervals, and different flicker frequencies of the at least one indicator lamp corresponding to the erase count state information of different count gradient ranges in the same count interval; and wherein the memory system is coupled with the second interface coupling structure of the heat dissipation device through the first interface coupling structure.

7. The memory apparatus of claim 6, wherein the state indication signal includes a first state indication signal, and the first state indication signal is configured to indicate at least one of read/write state information or abnormal state information.

8. The memory apparatus of claim 7, wherein the display structure is configured to:

receive the first state indication signal from the memory system through the second interface coupling structure;

control, according to the first state indication signal, at least one of the color or the flicker frequency of the at least one indicator lamp to be in a first display state, wherein the first display state is configured to indicate at least one of the erase count state information, the read/write state information, and the abnormal state information;

receive a second state indication signal from the memory system through the second interface coupling structure, wherein the second state indication signal is configured to indicate at least one of the erase count state information, the read/write state information, and the abnormal state information, and the first state indication signal and the second state indication signal indicate different working state information; and according to the second state indication signal, switch the at least one of the color or the flicker frequency of the at least one indicator lamp to be in a second display state, wherein the second display state is configured to indicate at least one of the erase count state information, the read/write state information, and the abnormal state information, and the first display state and the second display state indicates that the working state information of the memory system is different.

9. The memory apparatus of claim 6, wherein the display structure includes at least one display screen, and the at least one display screen is configured to indicate the working state information of the memory system by means of a number or a symbol.

10. The memory apparatus of claim 6, wherein the second interface coupling structure includes one or more elastic metal reeds.

11. The memory apparatus of claim 7, wherein the memory device is configured to:

send the first state indication signal to the heat dissipation device through the first interface coupling structure; and in response to an input instruction of a user, send a second state indication signal to the heat dissipation device through the first interface coupling structure, wherein the second state indication signal is configured to indicate at least one of the erase count state information, the read/write state information, and the abnormal state information, and the first state indication signal and the second state indication signal indicate different working state information.

12. The memory apparatus of claim 11, wherein the input instruction is from a host controller.

13. The memory apparatus of claim 6, wherein the first interface coupling structure includes one or more metal contacts.

14. A control method, comprising:

sending, by a memory system, a state indication signal to a second interface coupling structure of a heat dissipation device through a first interface coupling structure, wherein the state indication signal is configured to indicate working state information of the memory system, wherein the working state information includes erase count state information;

receiving, by the heat dissipation device, the state indication signal from the memory system through the second interface coupling structure; and adjusting at least one of a color or a flicker frequency of at least one indicator lamp coupled to the heat dissipation device to be in a display state, the display state to indicate the working state information of the memory system, wherein different colors of the at least one indicator lamp coupled to the heat dissipation device correspond to the erase count state information in different count intervals, and different flicker frequencies of the at least one indicator lamp correspond to the erase count state information of different count gradient ranges in the same count interval.

15. The control method of claim 14, wherein the state indication signal includes a first state indication signal, and the first state indication signal is configured to indicate at least one of the erase count state information, read/write state information, or abnormal state information, and the control method includes:

receiving, by the heat dissipation device, the first state indication signal from the memory system through the second interface coupling structure;

controlling, according to the first state indication signal, at least one of the color or the flicker frequency of the at least one indicator lamp to be in a first display state, wherein the first display state is configured to indicate at least one of the erase count state information, the read/write state information, and the abnormal state information;

in response to an input instruction of a user, sending, by the memory system, a second state indication signal to the heat dissipation device through the first interface coupling structure, wherein the second state indication signal is configured to indicate at least one of the erase count state information, the read/write state information, and the abnormal state information, and the first state indication signal and the second state indication signal indicate different working state information; and according to the second state indication signal, switching, by the heat dissipation device, the at least one of the color or the flicker frequency of the at least one indicator lamp to be in a second display state, wherein the second display state is configured to indicate at least one of the erase count state information, the read/write state information, and the abnormal state information, and the first display state and the second display state indicates that the working state information of the memory system is different.

16. The control method of claim 15, further including sending the first state indication signal to the heat dissipation device through the first interface coupling structure; and in response to the input instruction of the user, sending the second state indication signal to the heat dissipation device through the first interface coupling structure, wherein the second state indication signal is configured to indicate at least one of the erase count state information, the read/write state information, or the abnormal state information, and the first state indication signal and the second state indication signal indicate the different working state information.

17. The control method of claim 16, wherein the input instruction is from a host controller.

18. The control method of claim 14, wherein the at least one indicator lamp is included in a display structure that includes at least one display screen, and the control method further includes the indicating the working state information of the memory system by means of a number or a symbol on the at least one display screen.

19. The control method of claim 15, wherein the second interface coupling structure includes one or more elastic metal reeds.

20. The control method of claim 15, wherein the first interface coupling structure includes one or more metal contacts.

* * * * *